May 6, 1930.  A. L. PUTNAM  1,757,332
WHEEL SPOKE AND RIM CONNECTION
Filed Oct. 2, 1926  2 Sheets-Sheet 1
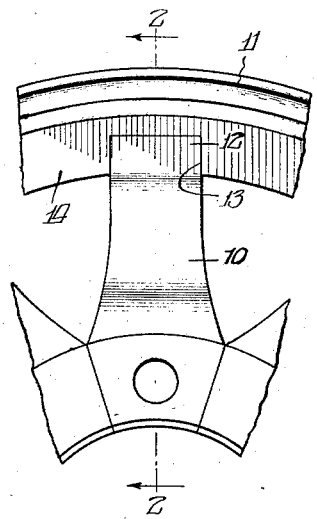
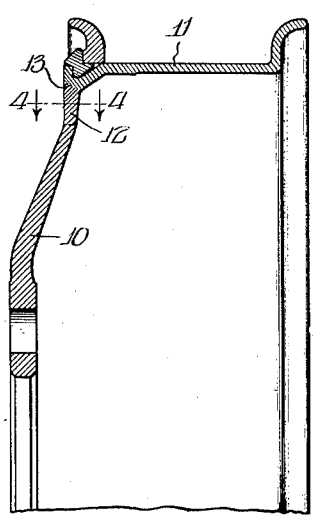
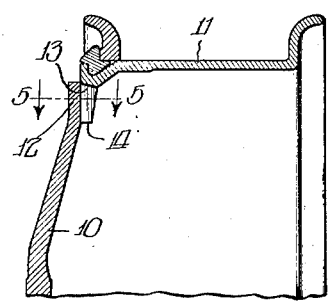
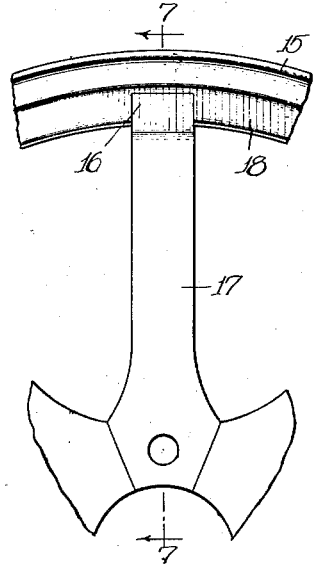
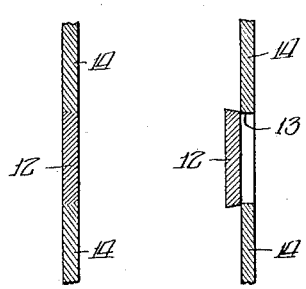
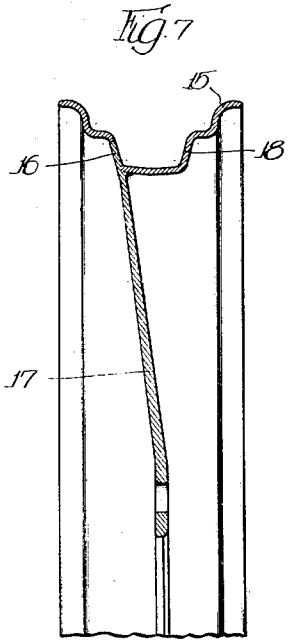
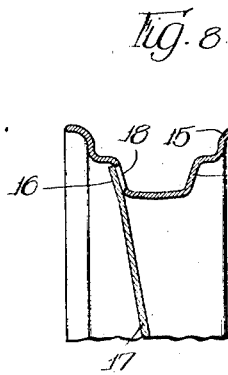
Inventor:
Alden L. Putnam, May 6, 1930.  A. L. PUTNAM  1,757,332
WHEEL SPOKE AND RIM CONNECTION
Filed Oct. 2, 1926   2 Sheets-Sheet 2
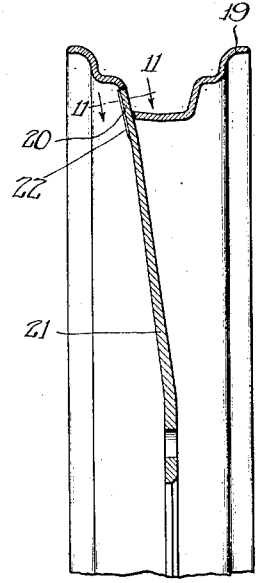
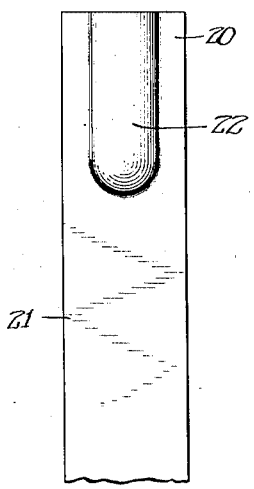
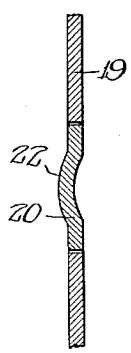
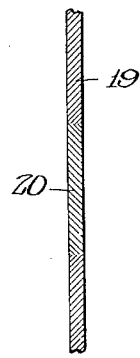
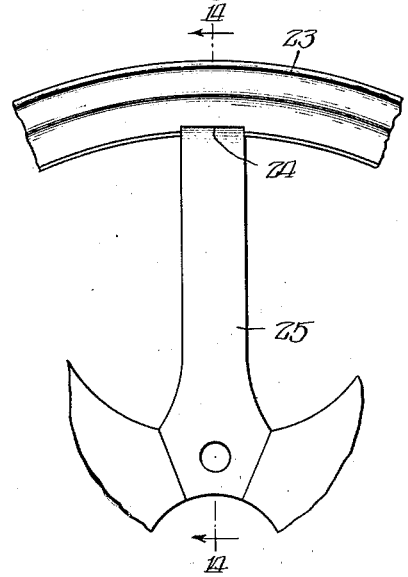
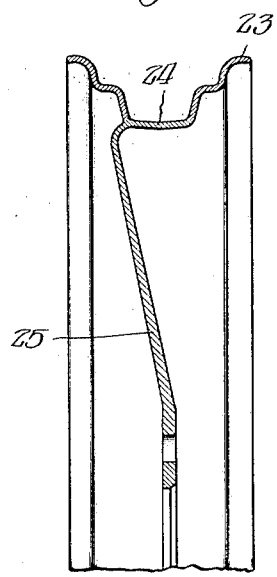

Patented May 6, 1930

1,757,332

UNITED STATES PATENT OFFICE

ALDEN L. PUTNAM, OF DEARBORN, MICHIGAN, ASSIGNOR, BY MESNE ASSIGNMENTS, TO STEEL WHEEL CORPORATION, OF LANSING, MICHIGAN, A CORPORATION OF MICHIGAN

WHEEL SPOKE AND RIM CONNECTION

Application filed October 2, 1926. Serial No. 139,141.

This invention relates to vehicle wheels of the metal spoke type, and has for its object the provision, in such a wheel, of an improved spoke and rim connection in which the outer end of the spoke is butt-welded flush in an aperture in the rim.

The spoke and rim connection of the invention gives a much better appearance to the wheel than that which would be given by an ordinary lapped and riveted joint, increases the strength of the wheel, decreases the weight, and materially cuts down the cost of manufacture.

Other objects and advantages of the invention will be evident to those skilled in the art upon a full understanding of the improved spoke and rim connection.

Several different forms of the connection are herein disclosed for the purpose of exemplification, but the invention is, of course, not limited in its application to the structural details necessarily shown in connection with such forms as it is obviously susceptible of embodiment in other modified forms coming equally within the scope of the invention as defined in the appended claims.

In the accompanying drawings:

Fig. 1 is a fragmentary face view of a wheel which has incorporated therein one form of the connection.

Fig. 2 is a section taken on line 2—2 of Fig. 1.

Fig. 3 is a section which corresponds generally to Fig. 2 but shows the cooperating spoke and rim portions as they would appear before the welding operation.

Fig. 4 is a section taken on the line 4—4 of Fig. 2.

Fig. 5 is a section taken on the line 5—5 of Fig. 3.

Fig. 6 is a fragmentary face view of a wheel which has incorporated therein another form of the connection.

Fig. 7 is a section taken on the line 7—7 of Fig. 6.

Fig. 8 is a section which corresponds generally to Fig. 7 but shows the cooperating spoke and rim portions as they would appear before the welding operation.

Fig. 9 is a section which corresponds generally to Fig. 8 but is illustrative of a wheel which has incorporated therein another form of the connection.

Fig. 10 is a fragmentary view of the spoke shown in Fig. 9.

Fig. 11 is a section taken on the line 11—11 of Fig. 9.

Fig. 12 is a section which corresponds generally to Fig. 11 but shows the spoke and rim portions as they would appear after the welding operation.

Fig. 13 is a fragmentary section through a wheel which has incorporated therein still another form of the connection.

Fig. 14 is a section taken on the line 14—14 of Fig. 13.

The embodiment of the invention illustrated in Figs. 1 to 5 inclusive will first be described. It will be observed therein that the connection is had between a metal spoke 10 and a metal rim 11 of the so-called quick-detachable type. The outer end 12 of the spoke, instead of being secured to the rim by a lapped and riveted connection, is received in an aperture 13 in an inwardly extending flange 14 of the rim, and is butt-welded flush about its edges with the edges of the aperture. The end 12 is preferably made wider than the aperture 13, and the side and end edges of the same are preferably bevelled, whereby the spoke and rim portions, after being placed in register for assembly, as shown in Figs. 3 and 5, may be forced together at a welding temperature and receive a good pressure weld between the thusly wedged edges, as shown in Figs. 2 and 4.

It will be appreciated that the cooperating spoke and rim portions, when arranged and secured in accordance with the connection of the invention, give a neat, smooth and unbroken contour to the face of the wheel, result in the elimination of considerable weight, add strength, and permit of manufacture at a greatly reduced cost.

In Figs. 6 to 8 inclusive the connection is shown as applied to a wheel in which the rim 15 is of the so-called drop-base type. The outer end 16 of the spoke 17 is butt-welded flush in an aperture which is formed in one of the bottom side walls 18 of the rim, the end 16 being formed, as to its width and edges, in substantially the same way as the end 12 of the spoke in the form which was first described.

In Figs. 9 to 12 inclusive the connection is shown as applied to another drop-base rim 19. The outstanding difference between this form of the connection and that illustrated in Fig. 6 to 8 inclusive is the shape which the end 20 of the spoke 21 is given before the welding operation. The end 20, instead of being made wider in straight-line measurement than the aperture in the rim, is so made as to fit into the aperture before the welding operation, and is formed with a curved portion 22 intermediate its side edges, which curved portion is caused to flatten out in the pressing and welding operation, thus forcing the side edges of the spoke against the edges of the aperture and giving substantially the same effect in the welding operation as would be obtained if the end were wedged laterally into the aperture.

In Figs. 13 and 14 the connection is shown as applied to still another drop-base rim 23. The end 24 of the spoke 25 is bent away from the front face of the wheel into the plane of the base of the rim, and is butt-welded flush in an aperture in the base.

I claim:

1. A method of connecting the outer end of a metal spoke to a metal rim, which consists in providing the rim with apertures having a width slightly less than the over-all width of the spokes, placing the outer end of the spoke in register with the aperture at its widest face, and simultaneously applying heat and pressure to bring the adjacent edges of the spoke and aperture to a welding temperature and force the spokes into the apertures with their edges in welding contact and with the faces of the rim and spoke substantially flush.

2. A method of connecting the outer end of a metal spoke to a rim, which consists in aperturing the rim, forming the outer end of the spoke in such a way that it will have tapering edges and will be wider in contour measurement taken before assembly with the rim than the aperture, placing the outer end of the spoke in register with the aperture, and simultaneously applying heat and pressure to bring the edges of the spoke and aperture to a welding temperature and force such edges into welding contact.

In testimony whereof I have hereunto subscribed my name.

ALDEN L. PUTNAM.